United States Patent [19]

Foster, Jr.

[11] Patent Number: 4,817,679

[45] Date of Patent: Apr. 4, 1989

[54] METHOD OF REPAIRING CARBON FIBER RAPIERS AND REPAIRED RAPIER

[76] Inventor: Lester F. Foster, Jr., Rte. 1, Box 446, Linwood, N.C. 27299

[21] Appl. No.: 40,160

[22] Filed: Apr. 17, 1987

[51] Int. Cl.⁴ .................. D03J 3/00; D22D 19/10; D32B 35/00

[52] U.S. Cl. ..................... 139/380; 29/402.18; 156/98

[58] Field of Search .......... 29/402.01, 402.18; 139/100, 449, 1 E, 20, 56, 11, 380; 156/94, 98

[56] References Cited

U.S. PATENT DOCUMENTS 2,722,734  11/1955  Grant .................. 156/94 X
2,795,523  6/1957   Cobb et al. .
4,102,363  7/1978   Deborde .............. 139/449
4,128,929  12/1978  DeMusis ............ 29/402.18 X Primary Examiner—Timothy V. Eley
Attorney, Agent, or Firm—Irvin A. Lavine

[57] ABSTRACT

A method for repairing carbon fiber rapiers used in weaving machines which have been split longitudinally comprises grinding the rapier at the split to form a longitudinal groove in the body of the rapier along the split, filling the groove with a paste of ground glass fiber in epoxy resin, and grinding off any resin paste which extends beyond the original rapier configuration. A repaired rapier having a groove filled with a mixture of epoxy resin and ground glass.

17 Claims, 1 Drawing Sheet

METHOD OF REPAIRING CARBON FIBER RAPIERS AND REPAIRED RAPIER

BACKGROUND OF THE INVENTION

The present invention relates to a method of repairing a body of carbon fiber, such as a rapier used in weaving machines, and to a repaired rapier.

Power operated looms for weaving fabric have been provided for approximately the last ten years with rapiers made of carbon fiber. These rapiers are frequently of channel shape, and may be thirty inches to eighty three inches in length. The carbon fiber rapiers are caused to slide back and forth during the weaving process in a longitudinal direction. In practice, it has been found that these carbon rapiers will break after a relatively short period of use, such as approximately three months. The carbon fiber rapiers split longitudinally, the split extending only part way along the length of the rapier, or in some cases, extending the entire length of the rapier and therefore dividing the rapier into two parts.

The splintered rapiers, no longer being usable, have either been discarded and replaced with new rapiers, or in some instances, operators of weaving machines in which the rapiers are used have simply stored the damaged rapiers in the hopes that a suitable repair method would eventually be found.

Attempts have been made to repair split rapiers by gluing the segments together. These attempts have failed, because the rapiers repaired by gluing have not proven serviceable in use.

Accordingly, for approximately the entire decade of use of carbon fiber rapiers prior to the advent of the present invention, no satisfactory repair method was known.

SUMMARY OF THE INVENTION

A method of repairing carbon fiber rapiers used in weaving machines or looms is provided, where the rapiers have been splintered so that a longitudinally extending split or crack has resulted in two distinct segments of the original rapier body. The method includes the forming of a groove which extends longitudinally along the split and which extends from a surface of the rapier body part way through the body. The groove is preferably made by removing material from both segments of the rapier, a grinding wheel of conventional construction being used for this purpose. A mixture is then provided of epoxy resin and ground glass, and this mixture is introduced into the groove, so that the groove is slightly over-filled. After the epoxy resin hardens, excess is removed by grinding, so as to restore the repaired rapier to essentially its original dimensions and configuration.

A carbon fiber rapier is provided having a groove extending into it, and a filling of epoxy resin and glass fiber fills the groove, the exposed surface of the resin-glass mixture being substantially the same as that of the original rapier.

Among the objects of the present invention are the provision of a method for repairing carbon fiber bodies such as rapiers.

Another object is to provide a method for repairing such bodies which is economical, and which uses readily available materials.

Still another object is the provision of a method for repairing such bodies which will produce repaired bodies entirely suitable for the same use as new bodies.

A further object of the present invention is to provide a rapier of carbon fiber and epoxy resin which is as strong and as durable as a new rapier and which is economical to produce.

Other objects and many of the attendant advantages of the present invention will be readily understood from consideration of the following specification, claims and drawing.

DESCRIPTION OF THE PREFERRED EMBODIMENT

Figure 1:
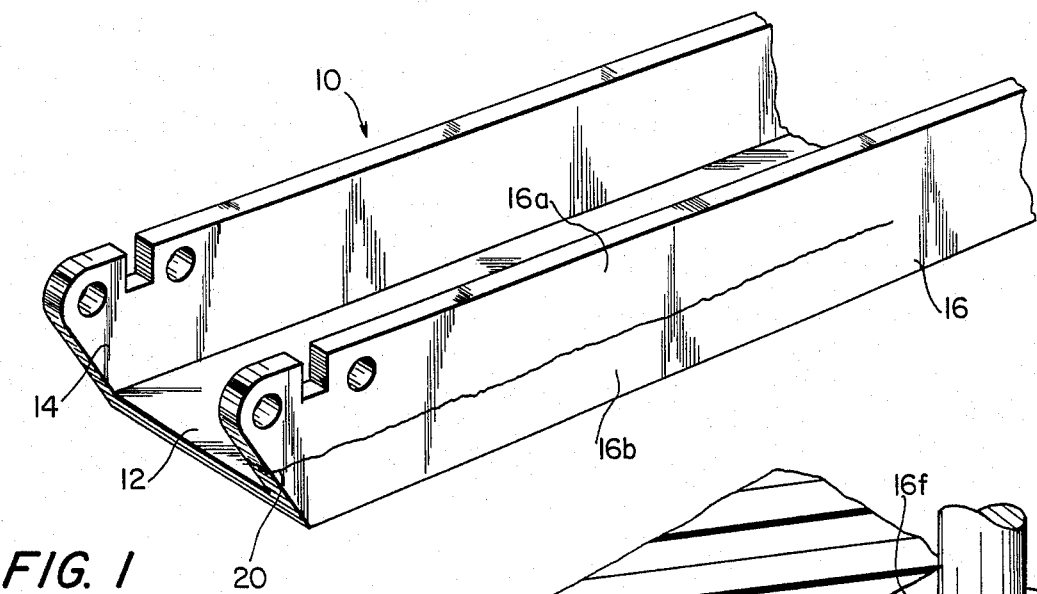
FIG. 1 is a perspective view of a damaged carbon fiber rapier, with parts thereof broken away.

Referring now to the drawings, wherein like or corresponding reference numerals are used for like or corresponding parts throughout the several views, there is shown in FIG. 1 a carbon fiber rapier 10 of a type commonly used in weaving looms. The rapier 10 is shown broken away, and will be seen to be of generally channel-shape, having a web 12 and flanges 14 and 16. A split 20 extends transversely of the flange 16, the split 20 extending longitudinally along the flange 16 for a substantial distance less than the length of the flange 16. On either side of the split 20, there are two segments of the flange 16, above the split 20 there being the segment 16a and below the split 20 there is the segment 16b.

A typical carbon fiber rapier may have a width between the external surfaces of the flanges 14 and 16 of slightly over one inch, and may be approximately thirty-five inches to eighty three inches long, and have a height of the flange, above the web 12 of approximately three-eighth inch. A single split 20 is illustrated in FIG. 1 as extending partly along the length of the flange 16: such a split may extend the full length of flange 16, and such split may also exist in the flange 14 and in the web 12.

Figure 2:
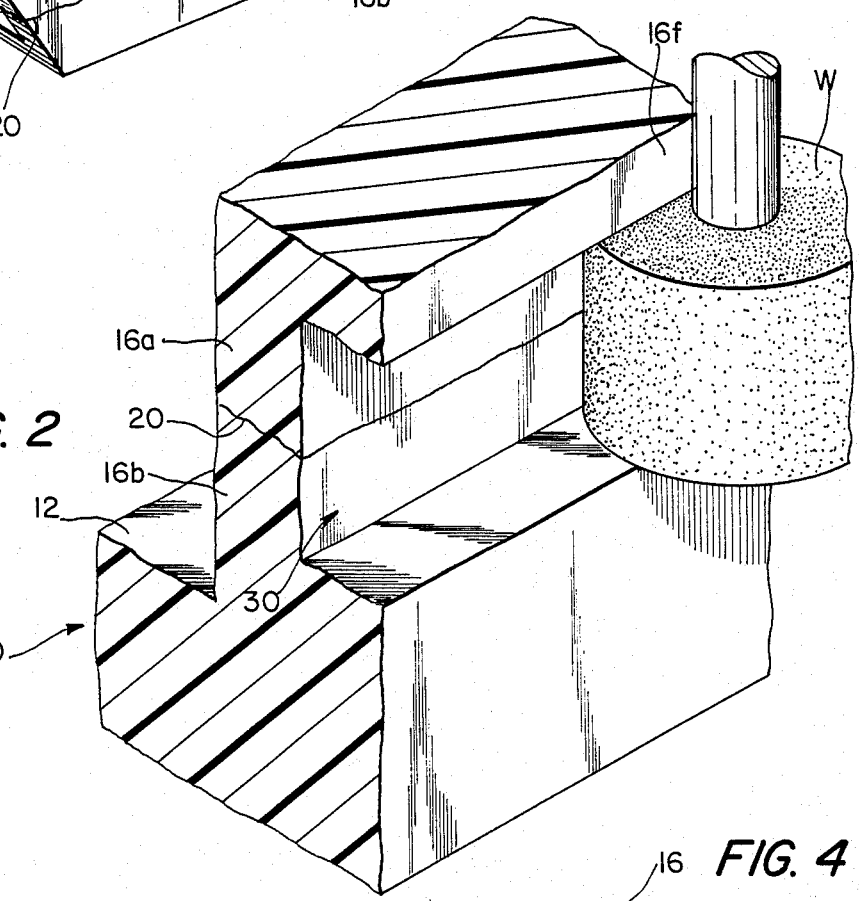
FIG. 2 is a perspective view illustrating the removal of material from a damaged rapier.

Referring now to FIG. 2, there is shown the segments 16a L and 16b of flange 16, with the split 20 therein. A groove 30 has been formed in the flange 20 by a conventional grinding wheel W. The groove 30 extends from the outer face or surface 16f of the flange 16 partly through the thickness of flange 16. Material will be seen to have been removed from both the segment 16a and the segment 16b to form the groove 30, and groove 30, although illustrated as being of generally rectangular shape along its length, may have other shapes, such as by moving the wheel W upwardly or downwardly so as to make the groove 30 of greater height, as illustrated in FIG. 2, than the thickness of the wheel W.

After the grinding of the flange 16 along the length of the split 20, and partly through the thickness of flange 16, it will be seen that the split 20 extends through the remaining part of flange 16.

Figure 3:
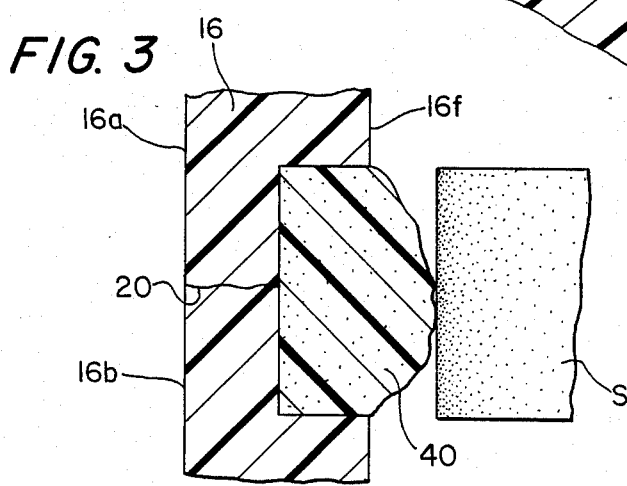
FIG. 3 is a cross-sectional view illustrating the filling of the groove and grinding of excess material.

There is next provided a paste, formed by mixing epoxy resin, ground glass and a hardener. Approximately one-half pint of ground glass is added to three pounds of epoxy resin, and a hardener is added to the epoxy resin in a ratio of one part hardener (catalyst) to five parts of epoxy resin. This paste as shown at 40 in FIG. 3 fills the groove 30 along its entire length: more particularly, as illustrated in FIG. 3, there is some excess paste 40 applied, the amount illustrated in FIG. 3 being exaggerated for purposes of clarity. In practice, the paste 40 will extend outwardly of the face 16f of the flange 16. After hardening, this excess of the epoxy paste 40 is removed by the sanders.

Figure 4:
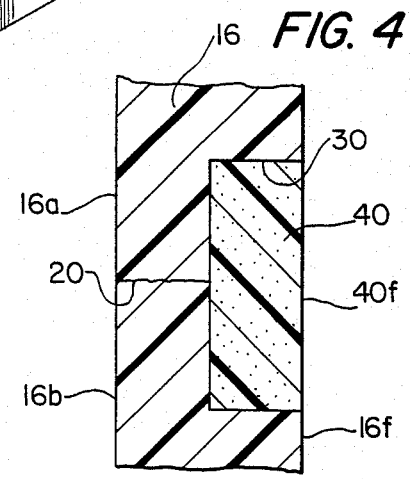
FIG. 4 is a cross-sectional view illustrating a repaired carbon fiber rapier.

Referring to FIG. 4, there is shown in cross-section a portion of the repaired flange 16 of the rapier 10. The epoxy 40 will be seen to occupy the full volume of the groove 30, and since the excess epoxy paste will have been removed by the sanders, the face 40f will be seen to be substantially coplanar with the face 16f of the flange 16. Although the split 20 extends from the inner surface of the flange 16 to the epoxy 40 in the groove 30, the segments 16a and 16b will be adhered to each other by epoxy 40. As a result, the restored or repaired rapier 10 will be as strong as the originally produced rapier 10, and because its configuration and dimensions will be substantially the same as that of the original rapier 10, it may be used in substitution therefor in the weaving machines, such as looms.

There has been provided a method of repairing split carbon fiber bodies, such as rapiers, which are used in weaving looms. The method herein provided is capable of being produced with conventional equipment and materials, and on an economical basis. For example, the cost of a repaired rapier 10 will be approximately one-third or less of the cost of a new replacement rapier. The repaired rapiers are fully operational in replacing original rapiers in the weaving looms and have experienced serviceability comparable to that of original rapiers.

It will be obvious to those skilled in the art that various changes may be made without departing from the spirit of the invention, and therefore the invention is not limited to that shown in the drawings and described in the specification, but only as indicated in the appended claims.

What is claimed is:

1. A rapier for use in a weaving machine comprising:
a longitudinally extending body of carbon fiber,
a groove in said body extending from a first surface thereof partly through said body,
a split extending from a second surface of said body opposite said first surface to said groove, and
a mixture of epoxy resin and glass fiber substantially filling said groove 2. The rapier of claim 1, wherein said groove is a longitudinal groove.

3. The rapier of claim 1, wherein said mixture of epoxy resin and glass fiber has a surface thereof substantially coplanar with the first mentioned surface.

4. The rapier of claim 3, said surface of said mixture being a ground surface.

5. The rapier of claim 1, wherein said mixture has a ground surface adjacent the first surface of said body.

6. A method of repairing a longitudinally extending body of carbon fiber having a longitudinally extending split therein and a segment of the body on either side of the longitudinal split, comprising:
forming a longitudinal groove in said body along said split, said groove extending into said body from a surface thereof to which said split extends,
providing a paste of epoxy resin and fiberglass, and
filling said longitudinal groove with said paste.

7. The method according to claim 6, and restoring the configuration of said repaired body substantially to that of the original configuration of said body by removing excess of said epoxy paste after hardening.

8. The method according to claim 7, wherein said removing of excess epoxy is by grinding.

9. The method according to claim 6, wherein the forming of said groove comprises the removal of material from both of said segments.

10. The method according to claim 9, wherein the forming of said groove is by grinding said segments along said split.

11. The method according to claim 6, wherein the forming of said longitudinal groove is by grinding said body along said split.

12. The method according to claim 11, and restoring the configuration of said repaired body substantially to that of the original configuration of said body by removing excess of said epoxy paste after hardening.

13. The method according to claim 6, wherein said forming of said longitudinal groove comprises the forming of a groove extending partially through said body.

14. A method of repairing a cloth making machine rapier of carbon fiber having a longitudinal split with a segment of the rapier on either side of the split comprising:
forming a groove partly through said body along said split by applying the periphery of a grinding wheel to said rapier body at said split and moving said grinding wheel along said split,
providing a mixture of epoxy resin and ground fiberglass and filling said groove with said mixture so that the mixture extends beyond the original configuration of said rapier, and
grinding off excess epoxy resin mixture after hardening to restore said repaired rapier substantially to the original configuration thereof.

15. The method according to claim 14, wherein said forming provides a groove which is an open channel of generally rectangular cross-sectional configuration.

16. The method according to claim 14, wherein said forming comprises engaging both said segments with a grinding wheel to thereby remove a portion of each said segment.

17. The method according to claim 14, wherein said mixture is provided by mixing approximately one-half pint of ground glass with three pounds of epoxy resin, and hardener catalyst in a ratio of approximately one part thereof to five parts epoxy resin.

* * * * *